United States Patent [19]

Palau Dominguez

[11] Patent Number: 5,740,589
[45] Date of Patent: Apr. 21, 1998

[54] MEANS FOR CLASPING THE EXTREMITIES OF THE METAL SHEET FORMING TIE-BANDS

[75] Inventor: Ramón Palau Dominguez, Sabadell, Spain

[73] Assignee: Mikalor, S.A., Sabadell, Spain

[21] Appl. No.: 765,440

[22] PCT Filed: May 7, 1996

[86] PCT No.: PCT/ES96/00099

§ 371 Date: Jan. 16, 1997

§ 102(e) Date: Jan. 16, 1997

[87] PCT Pub. No.: WO96/37722

PCT Pub. Date: Nov. 28, 1996

[30] Foreign Application Priority Data

May 26, 1995 [ES] Spain .................... 9501014

[51] Int. Cl.⁶ .................... B65D 63/00; F16L 47/00
[52] U.S. Cl. .................... 24/20 CW; 24/19; 24/20 EE
[58] Field of Search .................... 24/20 CW, 20 EE, 24/23 W, 20 TT, 20 LS, 19, 22; 403/282, 283

[56] References Cited

U.S. PATENT DOCUMENTS

| | | |
|---|---|---|
| 2,321,755 | 6/1943 | Kost . |
| 3,353,227 | 11/1967 | Kabel .................... 24/20 TT X |
| 4,299,012 | 11/1981 | Oetiker . |
| 4,622,720 | 11/1986 | Oetiker . |
| 4,724,583 | 2/1988 | Ojima .................... 24/20 CW X |
| 4,836,705 | 6/1989 | La Barge et al. .................... 403/283 X |
| 4,890,360 | 1/1990 | Calmettes et al. .................... 24/20 EE X |
| 5,051,020 | 9/1991 | Schleicher .................... 403/282 |
| 5,111,555 | 5/1992 | Oetiker .................... 24/20 CW X |
| 5,251,360 | 10/1993 | Putz . |
| 5,305,499 | 4/1994 | Oetiker .................... 24/20 CW X |
| 5,339,496 | 8/1994 | Oetiker .................... 24/20 CW |

FOREIGN PATENT DOCUMENTS

| | | |
|---|---|---|
| 0296919 | 12/1988 | European Pat. Off. . |
| 0616163A1 | 9/1994 | European Pat. Off. . |
| 1069204 | 7/1954 | France . |
| 82450 | 8/1956 | Netherlands .................... 24/20 W |
| 42.945 U | 7/1954 | Spain . |
| 119.952 U | 2/1966 | Spain . |
| 149.843 U | 6/1969 | Spain . |
| 260.128 U | 8/1981 | Spain . |
| 257.616 U | 3/1982 | Spain . |

*Primary Examiner*—Peter M. Cuomo
*Assistant Examiner*—Robert J. Sandy
*Attorney, Agent, or Firm*—Dennison, Meserole, Pollack & Scheiner

[57] ABSTRACT

A sheet metal clip with opposed overlapping first and second ends includes a guide tongue integral with the first end and receivable within an integral chamber adjacent the second end. A pair of integral projecting columns adjacent the first end are received through two holes formed adjacent the second end and closely conform thereto to retain the overlapped ends against longitudinal and rotational movements.

3 Claims, 1 Drawing Sheet

5,740,589

MEANS FOR CLASPING THE EXTREMITIES OF THE METAL SHEET FORMING TIE-BANDS

The subject of the present invention patent concerns improvements to means for fastening the ends of the sheet metal forming clips made of metal strip.

At present, clips are known which consist of a metal strip, of the type which at one end has a fastening guide tongue, while at the opposite end of the said metal strip there are hooks provided near one end of the strip, while at the opposite end are the engagement openings, being complementary to one another so that once the metal strip is coiled onto itself it remains closed, forming a ring.

This is the case with Spanish Utility Model No. 42.946, of Jose Montaner Genesca, dated 1954, for "IMPROVED COLLAR FOR PIPES".

It is also to be found in Utility Model No. 149.843 of Juan Gomez Larios, dated June 1969, for Utility Model No. 260.128, of Hans Oetiker, A. G., dated 31.8.81, for "CLIP ARRANGEMENT FOR HOSE PIPES"

Utility Model No. 257.616 of Hans Oetiker A. G., dated 7.5.80, for "CLIP ARRANGEMENT FOR HOSEPIPE".

These metal strips forming the clips also have projecting portions defined by an inverted "U"-shape, arranged in the circumferential direction of the clip. These parts in the shape of an inverted "U", also commercially called "lugs", are intended to allow the clip to be constricted by means of pliers, the jaws pressing one in the opposite direction to the other in order to effect deformation of the said inverted "U" by pressing radially against the inserted pipe.

This embodiment of the "lugs" belongs in the public domain and they have been known since 1958 according to U.S. Pat. No. 3,020,631, of E. R. Kennedy, for "Method for making pipe clips".

U.S. Pat. No. 3,106,757, dated 1961, of R. L. Thurston and coll.

However, in this type the alignment of the ends needs to be more precise in order to obtain greater and more correct constriction.

Included in the known type of clip with a tongue mentioned above, there are also others which have guide means to avoid such lateral deviation.

This is the case with Utility Model No. 119.952, dated 1966, of Emilio Valls and Enrique Prats.

In order to prevent the tongue from protruding beyond the level of the end of the superposed strip, there are also provided chambers for receiving the tongue, as is the case with Utility Model No. 149.843 and Utility Models No. 260.128 and No. 257.616.

Likewise, it is known in industry to join metal sheets, by means of the juxtaposition of two sheets, in which sheets there is made a through, transverse hole, common to both, and then a metal eyelet is introduced which is clinched.

This operation is similar to that carried out in order to fasten, at the folded end of a trouser belt, the corresponding metal buckle.

However, in the case of the ends of the belts, when folded onto themselves and with the bar of the buckle threaded on transversely, the joining of the fold for mounting the buckle does not present the same problem as when it is a question of joining two overlapping metal ends of the metal strip which constitutes the clip.

In the first place, the reaction of separation from each other of the two ends of the ring which constitutes the metal clip is much greater than that provided by the folding of the end of the leather strap which forms the belt.

Therefore when joining the folded leather end of the belt there is not created such a pronounced separation force as when there are coupled to each other, under pressure, the two ends of the curved metal strip by which curvature the metal strip is converted into an expanding spring.

In addition, in the leather material which forms the belt, the trim which surrounds the hole of the actual eyelet and which is fitted against the surface of the folded leather end, owing to its softness, makes it possible, when the ends of the eyelet are pressed with the clamping pliers, for the edge of the trim to be embedded in the leather material.

However, this does not happen in the case of ends of metal strip having a hard surface.

In this type of joining of superposed ends by means of an eyelet, neither is it of any importance that the said eyelet should make it possible to rotate the folded and joined end of the belt, since the cross-bar of the buckle inserted in the loop of the folded end of the belt, together with the cross-piece interpolated in the opening arranged in the obtuse two-sided angle of the said end folded onto itself prevents negative rotation.

However, the solution described has defects with regard to its application to metal clips constricting rubber pipes.

None of the solutions cited provides any security of alignment, without lateral deviation, of the tongue of one or the other end of the metal strip when the latter is forced to curve onto itself by overcoming the opposed expanding spring action.

The lateral deviations of one end placed, under pressure, facing the other end of the same metal strip forming the clip, are produced by the inherent tendency towards separation of the ends of one and the same metal strip, by expanding spring action, the opposed elastic force of which is concentrated in the central part of the total length of the curve of the strip, tending, in the misalignment of the two ends placed facing each other under pressure, to escape, generally in opposite directions, from the said opposing force producing the constant effect of negative misalignment.

When attempting to join two overlapped ends, head to head, of one and the same metal strip forming the body of the clip, the solutions cited above are not sufficient to avoid these misalignments, tending, through the opposing action of the spring effect, to keep constantly apart the said overlapped ends, placed one facing the other, of one and the same curved metal strip.

Therefore any slight blow or push imparted to one of the ends which are overlapped and joined to each other, known at present, such as occurs during transport of the clips from one place to another before they are placed round the rubber pipe, is sufficient to cause a slight deviation of the misalignment of the two overlapped ends in tension, and therefore portions projecting from the line of alignment are negatively produced.

These projections in addition constitute a projecting metal part with edges which, when the clip is constricted against the rubber pipe which it encloses, cause unwanted pinches which among other things produce incorrect seals.

The result achieved by means of the subject of the invention is that the alignment of the tongue of one end with the head of the opposite end of the same curved metal strip is perfect, without the possibility of rotating on itself at the point of union, which prevents any possibility of lateral deviations in spite of the opposing action of the two ends of the same metal strip which constitutes the metal clip.

The subject of the invention also facilitates the operation of joining the ends, facing one another, under pressure, of the curved clip, for those persons who have to use such clips, being those persons using them at the moment when they are placed transversely on the flexible pipe to be constricted.

By means of the subject of the invention, the users require only an implement which is very simple to operate, like pressure pliers.

In addition, the clinching is not able to be dismantled, allowing it to be handled without any problem on the assembly line.

On the other hand, when the clinched joint is produced by means of an eyelet independent of the body of the clip, which is joined by passing through coinciding holes, one provided in each of the overlapped ends of the clip, however well matched the diameter of the body of the eyelet and that of the holes may be, there is always a clearance between them to permit the passage of the body of the eyelet which passes through them.

When the clinching is carried out, in the known embodiment, the end without the trim, projecting from the level of the mouth of the hole of the upper overlapped end, is deformed and presses against the zone located round the edge of the hole of the upper end.

But it is very difficult for the body of the eyelet, that is to say, the section comprised between its trim and the upper end deformed by the pressure applied, also to be deformed in a suitable manner so that the deformation of the said section of the eyelet leaves the material constituting it stamped against the edge of the holes between which it has been inserted.

However, this other problem is also solved when the circular protuberance which emerges from the surface of one end of the strip is frustoconical in shape.

It is clear that this same frustoconical shape of the protuberance at the moment of its introduction under pressure already produces an action on the edge of the hole, an action constricting the frustoconical body introduced under pressure.

This action, while the metal strip is being completely coiled up by the user during its placement on the assembly line, also makes it easier for the eyelets introduced to drop and for the overlapped ends to separate from each other at the moment of assembly.

It also prevents the result that, owing to this existing clearance, although scarcely perceptible, between the diameter of the eyelet and the hole in which it is to be clinched, small rotating and pivoting movements of one end in relation to the other clinched end are produced.

Then these small movements increase their negative rotation as the clip is subjected to lateral forces causing deviation of one end relative to the other of the said strip, which ends are joined to each other.

A description is given below of a practical embodiment, provided by way of non-limitative example, of a clip according to these improvements, accompanied by a sheet of drawings in which FIG. 1 shows a metal strip open and partially coiled onto itself.

Figure 1:
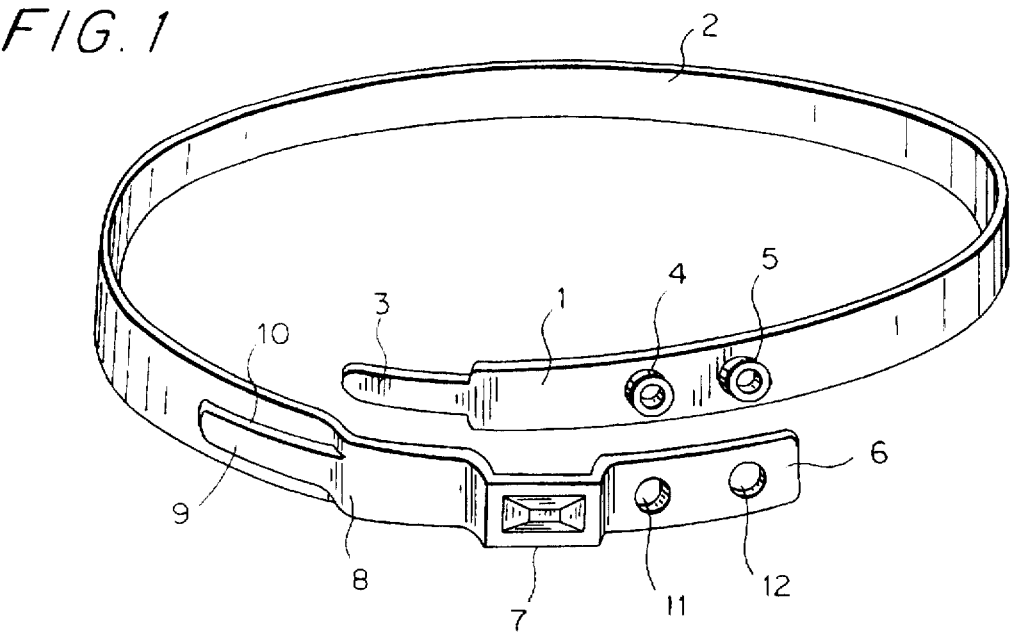

The invention consists in providing in the actual metallic material which constitutes one of the ends (1) of the metal strip (2) which constitutes the clip, such as that which has the projecting tongue (3) at its head, stamped portions (4 and 5) which on the opposite side emerge perpendicularly in the form of small columns.

On the opposite end (6) of the actual metal strip (2), such as that which near the latter has the constricting "lug" (7) and the stepped portion (8) with chamber (9) deformed by pressing and two parallel cuts (10) for housing the tongue (3) of the opposite end, there are provided through holes (11 and 12) coinciding in position with the columns (4 and 5), when the curved clip (2), under pressure, has the opposed ends facing one another and in an overlapped position.

On applying greater pressure to bring the aligned ends closer together, the temporary fastening of both aligned ends (1 and 6), under pressure, is achieved.

In this phase, if the placing of the clip transversely round the pipe to be constructed has not been correctly arranged, which may mean a negative result in the constriction, as often occurs with the creation of wrinkles in the wall of the pipe when the clip is badly arranged round it, the user may, without damaging the clip, begin again the operation of arranging the loop round the pipe.

Once the clip is considered to be properly in place, the user can then proceed, with pressure pliers, to carry out the clinching of one of the two columns, the first (4).

The clinching of this column (4) effects permanent joining of one aligned end to the other, overlapped end of the strip-clip.

However, this column (4) still leaves the possibility of the two aligned, overlapped ends (1 and 6) having a rotational movement at the point of union, and in order to avoid this the clip user then proceeds to clinch the second and neighbouring column (5) of the upper end, which clinching prevents rotation on itself of one of the ends (1 or 6) relative to the other overlapped end (6 or 1).

It is clear that with the creation of the columns (4 and 5) from the actual material of the strip (2), the operation of inserting any additional eyelet is rendered unnecessary.

In addition to saving on this operation, the loss of already inserted eyelets is avoided, especially during transport from the factory to the point of use by the user.

Another important detail, bearing in mind the utilisation of the clips, is that on the end from which the columns (4 and 5) rise, the opening which originates from their creation, is not completely weakened, since the actual material of the columns (4 and 5) provides it with suitable reinforcement, which reinforcement continues in the corresponding insertion opening (11 and 12) of the opposite end (6).

Figure 3:
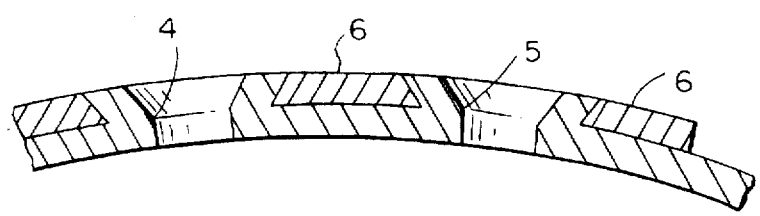
FIG. 3 shows on a larger scale the joining of one end to the/other of the actual strip forming the clip, with the clinching of the eyelet when the latter is in the shape of a small frustoconical column.
Figure 4:
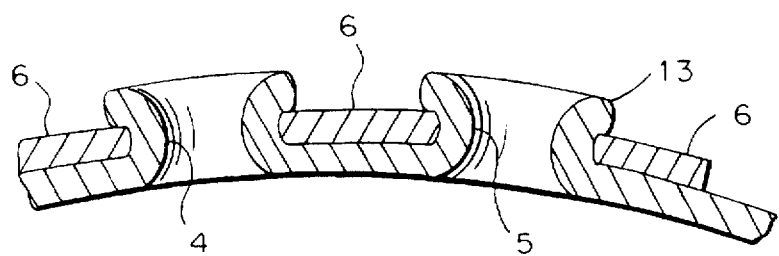
FIG. 4 shows the same illustration with the cylindrical column, clinched.

Depending on the point at which the clips are positioned, it may be convenient for the flange (13) of the clinched column which is shown on a large scale in FIG. 4 not to project from the surface of the upper overlapped end (6). The columns (4 and 5), instead of being cylindrical, are then frustoconical (FIG. 3), so that at the moment of clinching, the frustoconical walls are pressed in the said shape against the metallic material of the openings (11 and 12) into which they are inserted from the opposite end.

Figure 2:
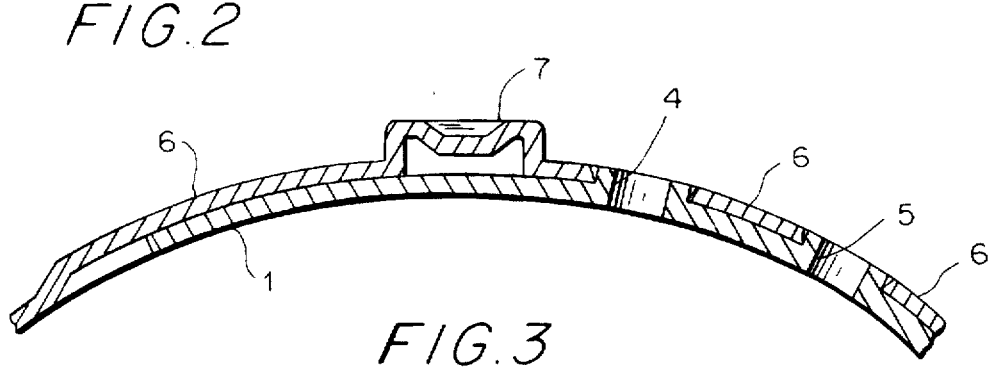
FIG. 2 shows a detail in section of the same clip as in FIG. 1, with its ends overlapped, joined by fastening, without the permanent clinched joint having yet been produced.

In this way, as can be seen from FIG. 2, the joint is of the dovetail type, which avoids projection of the edge of the column.

It is to be understood that, in the present case, details of construction and finish may vary which do not alter, change or modify the essence of the invention.

I claim:

1. In a means for fastening opposed overlapping ends of a sheet metal clip made of a unitary metal strip of predetermined length which forms a body and opposed first and second ends of the clip, a guide tongue integral with and defined on said first end for obtaining correct alignment, a chamber for housing said tongue defined by an integral offset portion adjacent said second end, said offset portion forming a depression receiving said tongue; the improvement characterized in that on a portion of said clip adjacent said first end, two perpendicular, projecting columns, integrally formed from said metal strip, are aligned one behind the other, said opposed second end having two through holes formed therein and dimensioned to conform to and closely receive said columns when said ends are overlapped wherein said columns inserted in said holes retain the overlapped ends against both longitudinal shifting and rotational movements.

2. The means for fastening a sheet metal clip as claimed in claim 1 in which each column has an outer portion extending to the surface of the overlapped second end, said outer portion of each column being permanently radially deformed completely thereabout and intimately engaged with and fixed to said second end peripherally about the corresponding through hole whereby both longitudinal and rotational shifting between said overlapping ends is precluded.

3. The means for fastening a sheet metal clip as claimed in claim 2 wherein each of said columns is substantially cylindrical and wherein each of said through holes is substantially circular.

\* \* \* \* \*